US012656169B2

(12) United States Patent
Hiller

(10) Patent No.: US 12,656,169 B2
(45) Date of Patent: Jun. 16, 2026

(54) HYDROACOUSTIC WAVE DETECTION VIA AN UNDERWATER CABLE

(71) Applicant: The Boeing Company, Arlington, VA (US)

(72) Inventor: Nathan D. Hiller, Irvine, CA (US)

(73) Assignee: The Boeing Company, Arlington, VA (US)

( * ) Notice: Subject to any disclaimer, the term of this patent is extended or adjusted under 35 U.S.C. 154(b) by 308 days.

(21) Appl. No.: 18/585,526

(22) Filed: Feb. 23, 2024

(65) Prior Publication Data

US 2025/0116548 A1 Apr. 10, 2025

Related U.S. Application Data

(60) Provisional application No. 63/587,741, filed on Oct. 4, 2023.

(51) Int. Cl.
*G01H 9/00* (2006.01)

(52) U.S. Cl.
CPC .................................. *G01H 9/004* (2013.01)

(58) Field of Classification Search
CPC . G01H 9/004; G01V 1/48; G01V 1/16; G01V 29/2418; H04B 13/02
See application file for complete search history.

(56) References Cited

U.S. PATENT DOCUMENTS

| | | | | |
|---|---|---|---|---|
| 7,755,971 B2 * | 7/2010 | Heatley | ..................... | G01V 1/16 |
| | | | | 367/16 |
| 8,621,922 B2 * | 1/2014 | Den Boer | .............. | G01C 13/00 |
| | | | | 73/170.29 |
| 8,989,656 B2 * | 3/2015 | Bruce | ..................... | B63B 21/42 |
| | | | | 455/39 |
| 9,140,815 B2 * | 9/2015 | Lopez | ..................... | G01V 1/16 |

OTHER PUBLICATIONS

Bouffaut et al., "Eavesdropping at the Speed of Light: Distributed Acoustic Sensing of Baleen Whales in the Arctic," Frontiers in Marine Science, 2022, pp. 1-13, vol. 9, Article 901348, frontiersin. org, accessed Feb. 20, 2024, https://www.frontiersin.org/articles/10. 3389/fmars.2022.901348/full.

(Continued)

*Primary Examiner* — Toan N Pham
(74) *Attorney, Agent, or Firm* — Yee & Associates, P.C.

(57) ABSTRACT

A hydroacoustic wave detection system that comprises a time delay generator and a hydroacoustic wave detector. The time delay generator is connected to an end of an underwater cable in which light signals travel in an optical fiber system in the underwater cable. The time delay generator is configured to introduce a time delay in the light signals received by the time delay generator to generate delayed light signals. The hydroacoustic wave detector is configured to control the time delay generator to generate a number of time delays. The hydroacoustic wave detector is configured to detect a presence of hydroacoustic waves for an event (e.g. underwater earthquake, underwater volcano, whale call) from an interferometric response determined using the light signals transmitted and the delayed light signals received. The hydroacoustic waves impinge on the underwater cable at a perturbation location along the underwater cable.

21 Claims, 10 Drawing Sheets

(56) References Cited

OTHER PUBLICATIONS

Caplan-Auerbach et al., "Hydroacoustic detection of submarine landslides on Kilauea volcano," Geophysical Research Letters, May 1, 2001, pp. 1811-1813, vol. 28, No. 9, accessed Feb. 20, 2024, agupubs.onlinelibrary.wiley.com, https://agupubs.onlinelibrary.wiley.com/doi/10.1029/2000GL012545.

Glowacki et al., "Application of Passive Hydroacoustics in the Studies of Sea-Ice, Icebergs and Glaciers: Issues, Approaches and Future Needs," Achievements, History, and challenges in Geophysics, GeoPlanet: Earth and Planetary Sciences, 2014, pp. 271-295, Springer International Publishing, accessed Feb. 20, 2024, https://link.springer.com/chapter/10.1007/978-3-319-07599-0_16.

Marra et al., "Ultrastable laser interferometry for earthquake detection with terrestrial and submarine cables," Science, Aug. 3, 2018, pp. 486-490, vol. 361, Issue 6401, science.org, accessed Feb. 20, 2024, https://www.science.org/doi/10.1126/science.aat4458.

Tepp et al., "The Seismo-Acoustics of Submarine Volcanic Eruptions," JGR Solid Earth, 2021, pp. 1-29, vol. 124, Issue 4, agupubs.onlinelibrary.wiley.com, accessed Feb. 20, 2024, https://agupubs.onlinelibrary.wiley.com/doi/full/10.1029/2020JB020912.

* cited by examiner

HYDROACOUSTIC WAVE DETECTION VIA AN UNDERWATER CABLE

CROSS-REFERENCE TO RELATED APPLICATION

This application claims the benefit of U.S. Provisional Patent Application Ser. No. 63/587,741, filed Oct. 4, 2023, and entitled "Hydroacoustic Wave Detection Via an Underwater Cable," which is incorporated herein by reference in its entirety.

BACKGROUND INFORMATION

1. Field

The present disclosure relates generally to detecting hydroacoustic waves and in particular, to detecting hydroacoustic waves via an underwater optical fiber.

2. Background

With the large expanse of the oceans, various environmental activities in the oceans cannot be observed from the surface. Underwater cables having optical fibers can be used as an environmental sensor. This type of sensor can detect ocean temperature changes, pressure changes, earthquakes, volcanic activities, whales, and other environmental changes. These and other changes result in physical changes to the underwater cable that can be correlated to those changes.

The use of optical fibers and underwater cables has a number of benefits. For example, this type of sensing is an optical sensing system that does not require electronic devices such as those used with monitoring devices such as motion seismometers, broadband seismometers, manometers, and hydrophones. Further, this type of sensing system is immune to electromagnetic interference and shows better anti-seawater-corrosion ability. Low transmission losses are present.

The time for light signals to travel along underwater cable can be monitored to detect physical changes to the underwater cable. For example, when a section of the optical fiber in an underwater cable undergoes stress, the time for light signals light to traverse this section of the optical fiber changes.

For example, an underwater earthquake generates hydroacoustic waves that impinges on the underwater cable causing a localized disturbance in the form of a physical wave in the underwater cable. This localized physical wave changes the state of light signal traveling in the underwater cable. This physical wave can take the form of a transverse wave having cable displacements perpendicular to the direction of the cable, or a longitudinal wave having cable density changes parallel to the direction of the cable, or a combination of both. In addition, this physical wave can be propagating wave or a standing wave.

The optical fiber becomes longer when a section of optical fiber is axially stretched. With this physical change, the time for light signals to traverse this section of the optical fiber increases even though speed of the light signals are slightly increased. The optical fibers become shorter when a section of optical fiber is axially compressed. As a result, the time for light signals light to traverse this section of fiber decreases even though its speed slightly decreased. The light timing can be determined over time by tracking the phase of the light.

Ultrastable laser interferometry is currently the most sensitive method for measuring environmental activity using existing underwater cables. Ultrastable laser interferometry involves transmitting light from one end of an optical fiber in an underwater cable that can have periodically spaced amplifiers. The length of the optical fiber can be thousands of kilometers.

In some configurations, at the end of the underwater cable, the light is "looped back" for transmission back through the same underwater cable but on a different optical fiber. This round-trip path ends when the light signals reach the starting point. At the starting point, the received light signals are interfered with the light signals being transmitted to track changes in the phase of the light signals. These changes in the phase of the light signals can be used to detect events such as earthquakes, volcanic activity, and whale calls.

SUMMARY

An embodiment of the present disclosure provides a hydroacoustic wave detection system that comprises time delay generator and a hydroacoustic wave detector. The time delay generator is connected to an end of an underwater cable in which light signals travel in an optical fiber system in the underwater cable. The time delay generator is configured to introduce a time delay in the light signals received by the time delay generator to generate delayed light signals. The hydroacoustic wave detector is configured to control the time delay generator to generate a number of time delays. The hydroacoustic wave detector is configured to detect a presence of hydroacoustic waves for an event from an interferometric response determined using the light signals transmitted and the delayed light signals received. The hydroacoustic waves impinge on the underwater cable at a perturbation location along the underwater cable.

Another embodiment of the present disclosure provides a hydroacoustic wave detection system that comprises a time delay generator, a laser interferometry system, and a hydroacoustic wave detector. The time delay generator is connected to an end of an underwater cable in which light signals travel in an optical fiber system in the underwater cable. The time delay generator system is configured to receive the light signals in a first optical fiber in the optical fiber system from a source location. The time delay generator system is configured to introduce a time delay in the light signals to form delayed light signals. The time delay generator system is configured to transmit the delayed light signals with the time delay in a second optical fiber in the optical fiber system to the source location. The laser interferometry system is connected to the optical fiber system in the underwater cable at the source location. The laser interferometry system is configured to determine an interferometric response for the light signals transmitted in the first optical fiber and the delayed light signals received in the second optical fiber. The hydroacoustic wave detector is configured to control the time delay generator to generate a number of time delays. The hydroacoustic wave detector is configured to detect a presence of hydroacoustic waves for an event from an interferometric response determined using the light signals transmitted and the delayed light signals received. The hydroacoustic waves impinge on the underwater cable at a perturbation location along the underwater cable. The hydroacoustic wave detector is configured to determine the presence of the perturbation location along the underwater cable using the interferometric response with the number of time delays.

Still another illustrative embodiment of the present disclosure provides a method for detecting hydroacoustic waves. Light signals are transmitted in an optical fiber system from a first end of an underwater cable having an optical fiber system. A number of time delays in light signals received in the optical fiber system at a second end of the underwater cable is introduced to generate delayed light signals. A presence of the hydroacoustic waves for an event is detected from an interferometric response determined for light signals transmitted and delayed light signals received, wherein the event generates hydroacoustic waves that impinge on the underwater cable at perturbation location along the underwater cable.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
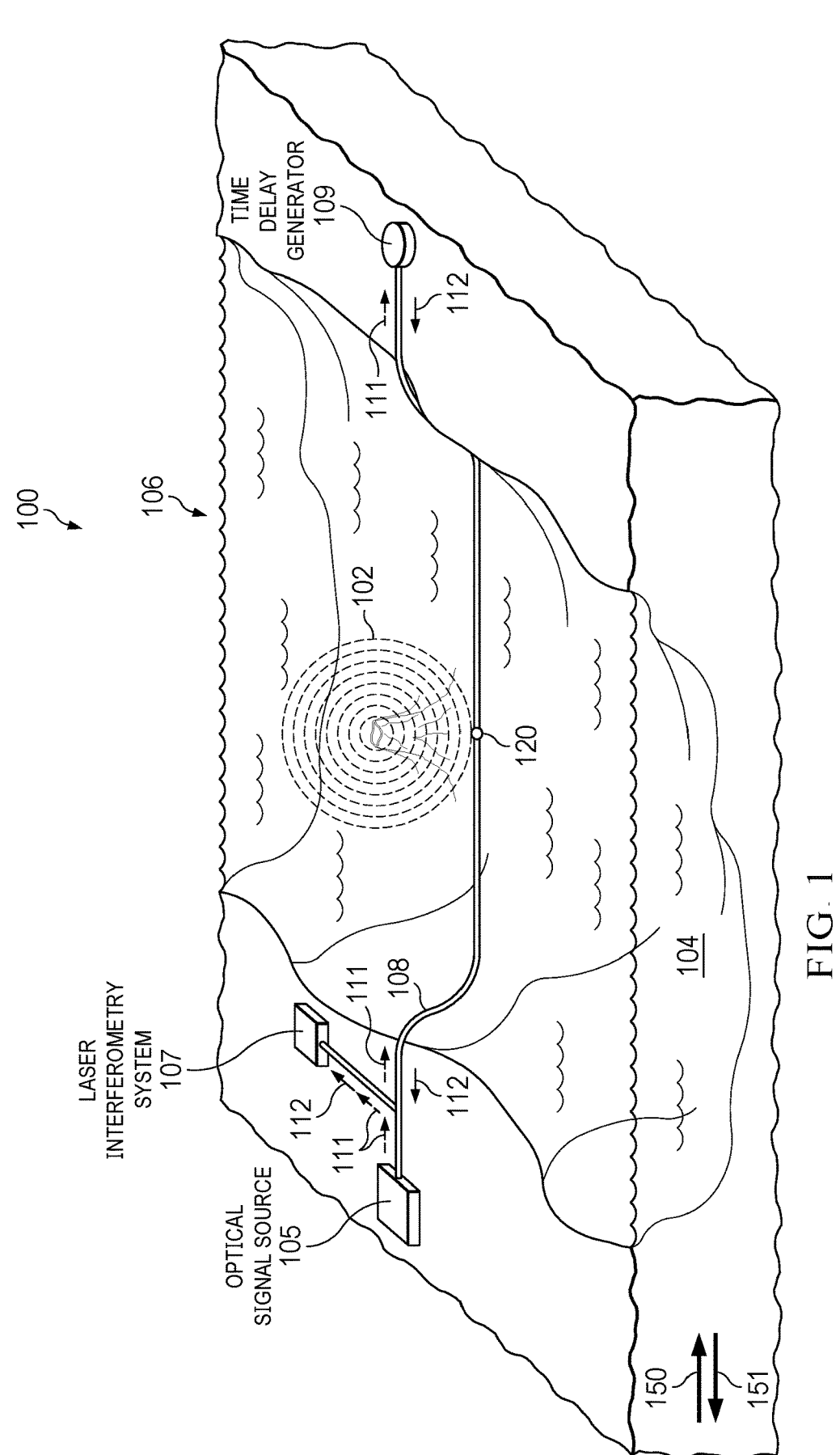
FIG. 1 is a pictorial representation of an environment in which hydroacoustic waves are generated in accordance with an illustrative embodiment.

The illustrative embodiments recognize and take into account one or more different considerations as described herein. Although ultrastable laser interferometry is very accurate, this technique can still have issues in detecting environmental activities that generate hydroacoustic waves. Ultrastable laser interferometry does not exploit the coherence of the environmental source, which results in a reduction in sensitivity.

For example, light signals traveling in a first direction in the underwater cable may travel through a section of underwater cable in tension. These light signals travel through the remainder of the cable underwater and are looped back to this same location where the underwater cable was in tension. At this location, the light signals traveling back in the opposite direction travel through a portion of the underwater cable undergoing compression. As a result, sections of the underwater cable result in a net timing change of light signals may be zero.

Thus, the illustrative examples provide a method, apparatus, and system that detects hydroacoustic waves. In one illustrative example, a hydroacoustic wave detection system that comprises a time delay generator and a hydroacoustic wave detector. The time delay generator is connected to an end of an underwater cable in which light signals travel in an optical fiber system in the underwater cable. The time delay generator is configured to introduce a time delay in the light signals received by the time delay generator to generate delayed light signals. The hydroacoustic wave detector is configured to control the time delay generator to generate a number of time delays. The hydroacoustic wave detector is configured to detect a presence of hydroacoustic waves for an event from an interferometric response determined using the light signals transmitted and the delayed light signals received. The hydroacoustic waves impinge on the underwater cable at a perturbation location along the underwater cable.

One or more illustrative examples can increase sensitivity in sensitivity for measuring environmental activity such as earthquakes or volcanic activity by exploiting the coherence of the environmental source. An optical time delay is introduced into the loopback of the light signals traveling in the optical fiber underwater cable at a far end from where the light signals are transmitted. This optical time delay is swept over a range of times while recording the response of the interferometer.

For some time delays, the delayed light signals moving in a first direction back towards the transmission source encounter a section of the first optical fiber in tension. The light signals without a time delay moving in a second direction the opposite to the first direction encounter compression at the same location in the second optical fiber. With this example, the interferometric response may be weak. But for other time delays, the light signals encounter a section of the optical fiber in tension moving first direction, and a section of second fiber in the same location in tension for light signals moving in the second direction. In this case, the interferometric response is stronger.

A plot of the interferometric response as a function of time delay can be periodic, with the strongest responses being periodic peaks and the weakest responses being periodic nulls. Using this response versus a time delay plot, the frequency and location of the environmental activity can be determined.

Furthermore, the illustrative examples can result in peak responses and can be 3 dB higher than the response of the same configuration with a one-way trip and without the time delay.

With reference now to the figures and, in particular, with reference to FIG. 1, a pictorial representation of a pictorial representation of an environment in which hydroacoustic waves are generated is depicted in accordance with an illustrative embodiment. In this illustrative example, hydroacoustic wave environment 100 is an environment in which hydroacoustic waves 102 are generated by an event. In this example, the event is activity from an underwater volcano.

As depicted, hydroacoustic waves 102 travel underwater in ocean 104. These hydroacoustic waves 102 can be detected by hydroacoustic wave detection system 106. As depicted in this example, hydroacoustic wave detection system 106 comprises optical signal source 105, underwater cable 108, time delay generator 109, and laser interferometry system 107. In one example, laser interferometry system 107 can use a narrow linewidth laser and has a line width that is sub-Hz, such as 0.8 Hz.

In this example, transmitted light signals 111 are generated by optical signal source and transmitted in underwater cable 108. Underwater cable 108 is an optical underwater cable in which an optical fiber system is located. The optical fiber system comprises a number of optical fibers. As used herein, "a number of" when used with reference to items, means one or more items. For example, "a number of optical fibers" is one or more optical fibers. In other words, the optical fiber system can include one or more fibers that extend the length of underwater cable 108.

Transmitted light signals 111 travel through an optical fiber in the number of optical fibers in underwater cable 108 and reach time delay generator 109. Time delay generator 109 alone generates time delays in transmitted light signals 111. When optical light signals are transmitted back into underwater cable 108, these optical light signals are return light signals 112. Return light signals 112 can have different delays based on a sweep of time delays formed by time delay generator 109.

Return light signals 112 are sent to laser interferometry system 107 and combined with light signals 111. This combination creates interference from the superposition of transmitted light signals 111 with return light signals 112. A measurement of the phase difference between transmitted light signals 111 and return light signals 112 can be made from the combination of these light signals. In these examples, the phase difference is measured indirectly by measuring the optical power from combining the light signals.

In this illustrative example, hydroacoustic waves 102 impinge on underwater cable 108. This impingement can result in at least one of compression or extension of an optical fiber system in underwater cable 108. In this example, the optical fiber system comprises the number of optical fibers.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Transmitted light signals 111 traveling in first direction 150 in underwater cable 108 travel through a section of underwater cable in compression at location 120. These transmitted light signals travel through the remainder of underwater cable 108 and are looped back to travel in second direction 151 opposite to first direction 150 as return light signals 112. In this case, time delays are created such that return light signals 112 travel through the portion of underwater cable 108 at location 120 that is compression. By sweeping through time delays, the likelihood of detecting a presence of hydroacoustic waves is increased as compared to current techniques.

Further, the interferometry response generated by interfering transmitted light signals 111 and return light signals 112 with time delays can be used to determine location 120 of where hydroacoustic waves 102 impinged on underwater cable 108. For example, transmitted light signals 111 are combined with return light signals 112. This comparison results in a power measurement. For example, the two light signals can be offset from each other such that power measurement is 50%. In other words, the optical path length of one of the light signals and optical path length of the second light signals can result in interference that is not fully constructive and not fully destructive resulting in half of the light striking the optical detector.

If the measurements continues to be 50%, then the interferometric response is 0 because the difference between the readings is 0. In these examples, the changes in phase are measured indirectly by measuring the optical power.

In these illustrative examples, increasing time delays in return light signals 112 are added by the time delay generator. When hydroacoustic waves 102 impinge on location 120, the changes in compression and tension to the optical fibers at location 120 result in changes in the difference between measurements that changes in value such that a curve can be identified from the measurements for the interferometric response. Peaks can be identified in the curve.

In the illustrative examples, this information can be used to determine a presence of hydroacoustic waves 102. Further, information can also be used to determine the frequency of hydroacoustic waves 102. Additionally, a location of hydroacoustic waves 102 can also be determined using the curve determined from the interferometric response at different time delays. Thus, the use of time delays added to transmitted light signals 111 can result in measurements that yield information enabling the detection of hydroacoustic waves and location 120 on underwater cable 108 where hydroacoustic waves 102 impinged on underwater cable 108. Additionally, this information can also be used to determine the frequency of hydroacoustic waves 102.

The illustration of hydroacoustic wave detection system is provided as an example and not meant to limit the manner in which other illustrative examples can be implemented. In another illustrative example, optical signal source 105 may not be considered part of hydroacoustic wave detection system 106.

Thus, the illustrative example in FIG. 1 enables repeated underwater cable sensing of hydroacoustic waves by boosting the wave's signal, and locating hydroacoustic waves without cross-correlating double ended cable measurements. Light signals are transmitted in the optical fiber and phase changes are monitored. But rather than sensing phase changes on the far end of the fiber, a time-delay with a loop-back is placed is used to delay the light signals and send back the delayed light signals in the optical fiber to its original launch site, where its phase changes will be sensed.

By sweeping through a range of time delays, the signal of a hydroacoustic wave perturbing the cable can be boosted higher (up to 3 dB) and characterized in terms of the hydroacoustic wave's frequency, and its location along the underwater cable can be determined.

Figure 2:
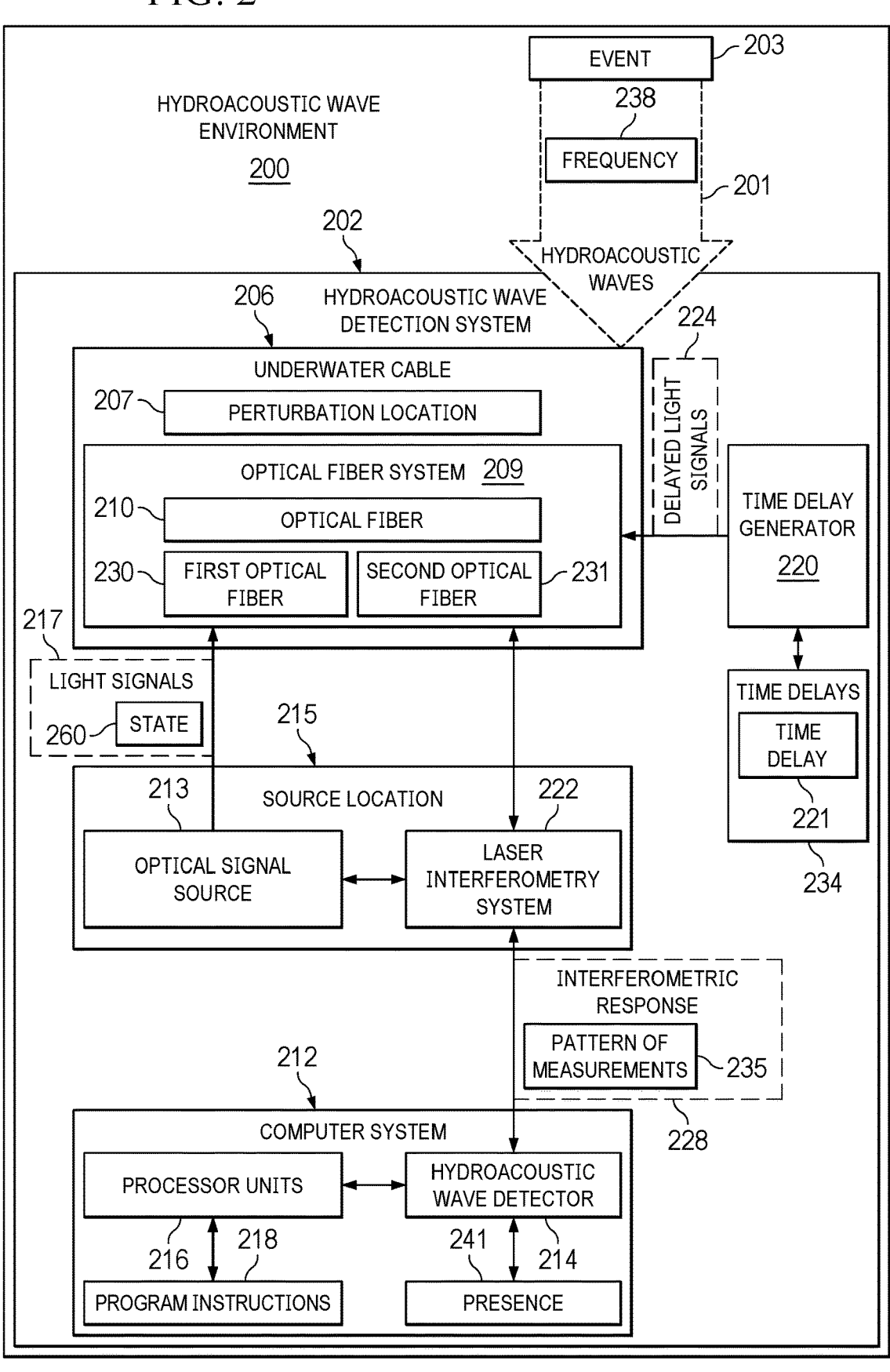
FIG. 2 is a block diagram of an hydroacoustic wave environment in accordance with an illustrative embodiment.

With reference now to FIG. 2, a block diagram of a hydroacoustic wave environment is depicted in accordance with an illustrative embodiment. In this illustrative example, hydroacoustic wave environment 200 is an environment in which hydroacoustic waves 201 are acoustic waves that travel underwater. Hydroacoustic waves 201 can be generated by event 203. Event 203 can be, for example, selected from a group comprising an earthquake, volcanic activity, an underwater landslide, an iceberg collision, a meteor impact, a whale call, and other suitable types of events that can cause hydroacoustic waves 201.

In one illustrative example, hydroacoustic waves 201 are temporally coherent. Hydroacoustic waves 201 can be temporally coherent when hydroacoustic waves 201 have a single frequency or a dominant frequency when multiple frequencies are present. Further, hydroacoustic waves 201 can have a dominant frequency as defined by the peak frequency in a curve of a Fourier transform or a fast Fourier transform of the hydroacoustic waves.

As depicted in this example, hydroacoustic waves 201 impinge on underwater cable 206 at perturbation location 207 along underwater cable 206. In this example, underwater cable 206 includes optical fiber system 209. Optical fiber system 209 comprises a number of optical fibers. The impingement by hydroacoustic waves 201 on underwater cable 206 can change characteristics of a number of optical fibers in optical fiber system 209. As a result, the impingement by hydroacoustic waves 201 can change a state 260 of light signals 217 traveling through optical fiber 210 in the optical fiber system 209. In this example, state 260 can be a phase of light signals 217. For example, a compression in a section of optical fiber 210 can increase the speed of light signals 217 through that section. Tension in a section of optical fiber 210 can result in the speed of light signals 217 being decreased through that section. This change in speed can result in a change in phase that can be measured.

In this illustrative example, hydroacoustic waves 201 impinging on underwater cable 206 can be detected using hydroacoustic wave detection system 202. As depicted, hydroacoustic wave detection system 202 comprises time delay generator 220, laser interferometry system 222, and hydroacoustic wave detector 214.

In this illustrative example, time delay generator 220 is connected to an end of an underwater cable in which light signals 217 travel in optical fibers in the underwater cable 206. For example, light signals 217 are transmitted from optical signal source 213 at source location 215. Optical signal source 213 can be, for example, a laser, a light emitting diode system, a laser diodes, and optical parametric oscillator, a super luminescent diode, a Raman amplifier, and other suitable types of light sources. In this illustrative example, optical signal source 213 is a laser that outputs a sub-Hz line-width laser. Decreasing the laser linewidth can enable using longer underwater cables for sensing hydroacoustic waves.

In this example, time delay generator 220 is configured to introduce time delay 221 in light signals 217 received by time delay generator 220 to generate delayed light signals 224. These delayed light signals are sent back into optical fiber system 209 and underwater cable 206.

In this example, laser interferometry system 222 is connected to optical fiber system 209 in the underwater cable at source location 215. In this example, laser interferometry system 222 is configured to determine interferometric response 228 for light signals 217 transmitted in optical fiber system 209 and the delayed light signals 224 received from the optical fiber system 209.

In one illustrative example, light signals 217 and delayed light signals 224 can be transmitted through optical fiber 210 in underwater cable 206 with optical fiber 210 being a bidirectional optical fiber. In another illustrative example, light signals 217 can be transmitted through first optical fiber 230 in optical fiber system 209. With this example, delayed light signals 224 can be transmitted through second optical fiber 231 in optical fiber system 209. In other words, different optical fibers in an optical fiber system 209 can be used to transmit light signals of different directions in underwater cable 206.

In this example, hydroacoustic wave detector 214 receives interferometric response 228 and uses this information to detect hydroacoustic waves 201. Hydroacoustic wave detector 214 can be implemented in software, hardware, firmware or a combination thereof. When software is used, the operations performed by hydroacoustic wave detector 214 can be implemented in program instructions configured to run on hardware, such as a processor unit. When firmware is used, the operations performed by hydroacoustic wave detector 214 can be implemented in program instructions and data and stored in persistent memory to run on a processor unit. When hardware is employed, the hardware can include circuits that operate to perform the operations in hydroacoustic wave detector 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer.

When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, hydroacoustic wave detector 214 performs the number of different operations in detecting presence 241 of hydroacoustic waves 201. For example, hydroacoustic wave detector 214 controls time delay generator 220 to generate a number of time delays 234. In this example, the number of time delays 234 are generated for light signals 217 received in an optical fiber system 209 to generate delayed light signals 224. In this illustrative example, the number of time delays 234 were changed in incremental fashion. This change can also be referred to as being swept. For example, wherein the time delays can be swept by changing the time delays from 0 ms to p ms in increments of i ms.

Further, time delays 234 can be incrementally or progressively increased. As result, time delays 234 increase in size over time. In these examples, time delays 234 can be selected to boost interferometric response 228 for hydroacoustic waves 201. Interferometric response 228 can be increased 3 dB higher than the peak response of a one-way configuration without the time delay.

Additionally, time delays 234 can be selected to filter interferometric response 228 to suppress a number of unwanted frequencies in interferometric response 228 generated in response to hydroacoustic waves 201. Environmental noise can cause unwanted frequencies. For example, in detecting presence 241 of hydroacoustic waves 201 for an underwater volcanic eruption, a land slide, an iceberg collision, or a whale call, environmental noise can be present. Further, waves and currents can be environmental noise that can be present with hydroacoustic waves 201.

In these examples, time delays 234 can be selected to boost interferometric response 228 and filter interferometric response 228 to suppress a number of unwanted frequencies in the interferometric response simultaneously. Thus, the use of time delays 234 can increase the ability to detect presence 241 of hydroacoustic waves 201.

In this example, hydroacoustic wave detector 214 controls laser interferometry system 222 to make a number of measurements of light signals 217 and delayed light signals 224 with each of time delays 234 to generate interferometric response 228. In this example, interferometric response 228 can be a number of the measurements made by laser interferometry system 222. In other words, interferometric response 228 can be a number of measurements at each of time delays 234. In other examples, interferometric response 228 can be measurements made for multiple ones of time delays 234. By changing time delays 234, the presence of pattern of measurements 235 in interferometric response 228 indicates presence 241 of hydroacoustic waves 201.

In this illustrative example, hydroacoustic wave detector 214 receives interferometric response 228 from laser interferometry system 222. Hydroacoustic wave detector 214 detects presence 241 of hydroacoustic waves 201 for event 203 from interferometric response 228 determined using light signals 217 transmitted and delayed light signals 224 received. In this example, hydroacoustic waves 201 impinge on underwater cable 206 at perturbation location 207 along underwater cable 206.

Additionally, hydroacoustic wave detector 214 determines perturbation location 207 along underwater cable 206 using interferometric response 228 with the number of time delays 234. In this example, interferometric response 228 contains measurements made at different ones of time delays 234. For example, three time delays and time delays 234 may provide sufficient information to detect hydroacoustic waves 201. Further, hydroacoustic wave detector 214 can also determine frequency 238 for hydroacoustic waves 201.

Thus, hydroacoustic wave detector 214 can determine a presence of hydroacoustic waves 201, perturbation location 207, and frequency 238. The detection of this information is performed using interferometric response 228 with time delays 234.

Figure 3:
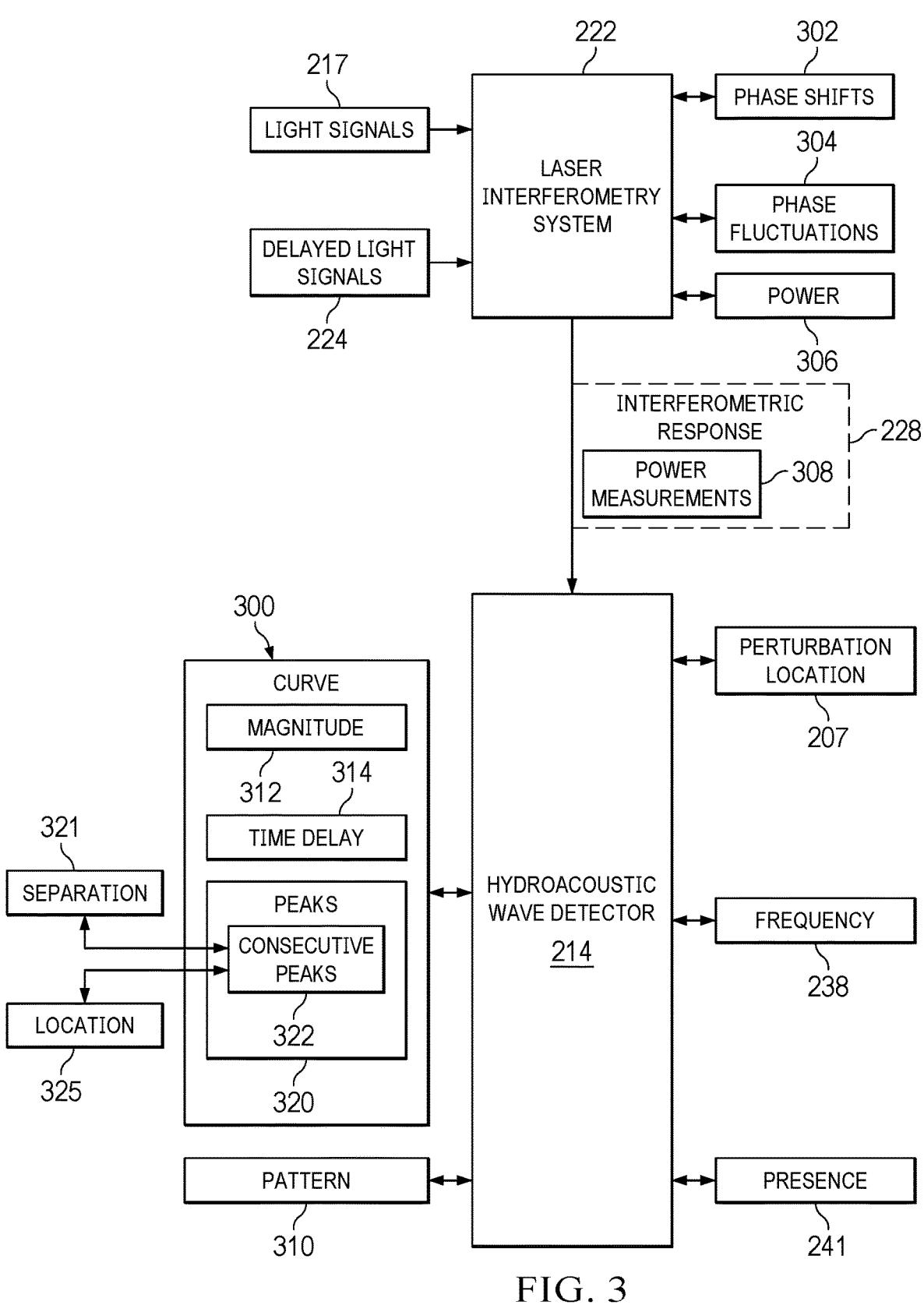
FIG. 3 is an illustration block diagram of dataflow for detecting hydroacoustic waves in accordance with an illustrative embodiment.

Turning next to FIG. 3, an illustration block diagram of dataflow for detecting hydroacoustic waves is depicted in accordance with an illustrative embodiment. In the illustrative examples, the same reference numeral may be used in more than one figure. This reuse of a reference numeral in different figures represents the same element in the different figures.

In this illustrative example, hydroacoustic wave detector 214 processes interferometric response 228 to detect presence 241 of hydroacoustic waves 201 for event 203. In detecting hydroacoustic waves 201, hydroacoustic wave detector 214 can determine perturbation location 207. Further, as part of detecting hydroacoustic waves 201, hydroacoustic wave detector 214 can also determine frequency 238 of hydroacoustic waves 201.

In detecting hydroacoustic waves 201, hydroacoustic wave detector 214 determines curve 300 using interferometric response 228. In this example, curve 300 is a curve of magnitude 312 of phase fluctuations 304 versus time delay 314 using phase shifts 302 in interferometric response 228 received from laser interferometry system 222. In this example, laser interferometry system 222 measures phase shifts 302 between light signals 217 and delayed light signals 224 includes this information as part of interferometric response 228. In this example, phase shifts 302 can have phase fluctuations 304.

In these examples, phase fluctuations 304 are not measured directly by laser interferometry system 222. Laser interferometry system 222 measures phase fluctuations 304 indirectly through measuring power 306 from interfering light signals 217 and delayed light signals 224 with each other. In other words, light signals 217 are combined with delayed light signals 224 such that they interfere with each other creating an interference pattern. This pattern can be a constructive or destructive interference between these light signals. This experience can have peaks and troughs. In this example, laser interferometry system generates interferometric response 228 using power measurements 308 of power 306 that represent phase shifts 302 that have phase fluctuations 304. Interferometric response 228 containing power measurements 308 are used to determine curve 300 of magnitude 312 of phase fluctuations 304 versus time delay 314.

In this illustrative example, hydroacoustic wave detector 214 detects presence 241 of hydroacoustic waves 201 in response to pattern 310 being present in curve 300. In this example, pattern 310 can be an oscillating pattern. For example, curve 300 can have a pattern 310 for magnitudes of a sinusoidal wave. This pattern can take the form of peaks 320 that repeat at equal distances (i.e. periodic). For example, curve 300 can be a modulus of a sinusoidal wave resulting from power measurements 308. If hydroacoustic waves 201 are not present, curve 300 can be a flat line or a noise signal.

In this illustrative example, hydroacoustic wave detector 214 can determine frequency 238 of hydroacoustic waves 201 in addition to detecting the presence of hydroacoustic waves 201. For example, hydroacoustic wave detector 214 can determine frequency 238 of hydroacoustic waves 201 waves using separation 321 of consecutive peaks 322 in curve 300. In this example, consecutive peaks 322 can be two peaks. In other examples, more than two peaks can be examined to verify separation 321 and to improve calculation accuracy by averaging.

Further, hydroacoustic wave detector 214 can also determine perturbation location 207 using curve 300. For example, hydroacoustic wave detector 214 can determine perturbation location 207 using separation 321 of consecutive peaks 322 in curve 300 and location 325 of any single peak in curve 300. The location of any peak can be used in these examples. In these examples, the determination of perturbation location 207 can be made using frequency 238 of hydroacoustic waves 201 and location 325 of one peak in consecutive peaks 322.

In the illustrative examples, one or more solutions are present that overcome a problem with detecting the presence of hydroacoustic waves traveling in the water caused by events. Further, one or more illustrative examples increase the ability to detect the presence of hydroacoustic waves that impinges on an underwater cable having an optical fiber system. Detecting the presence of hydroacoustic waves can increase their use of time delays that are introduced into light signals traveling with an optical fiber system in the underwater cable. In one illustrative example, at least one of frequency of hydroacoustic waves or a location where the hydroacoustic waves impinged on the underwater cable can be determined as part of detecting hydroacoustic waves. As a result, the use of time delays can increase the amount of information that can be determined in detecting hydroacoustic waves as compared to current techniques.

Further, one or more illustrative examples also can increase the power readings in an interferometric response and provide an ability to filter out noise based on selections of the time delays. As a result, one or more of the illustrative examples can increase the ability to detect the presence of hydroacoustic waves impinging on an underwater cable.

The illustration of hydroacoustic wave environment 200 and the different components in FIGS. 2 and 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, optical repeaters can be present along optical fibers and underwater cable 206. An optical computer can generate or amplify light signals traveling in the optical fibers. Optical repeaters are not present in these examples when an optical fiber is used for bidirectional transmission of light signals.

Figure 4:
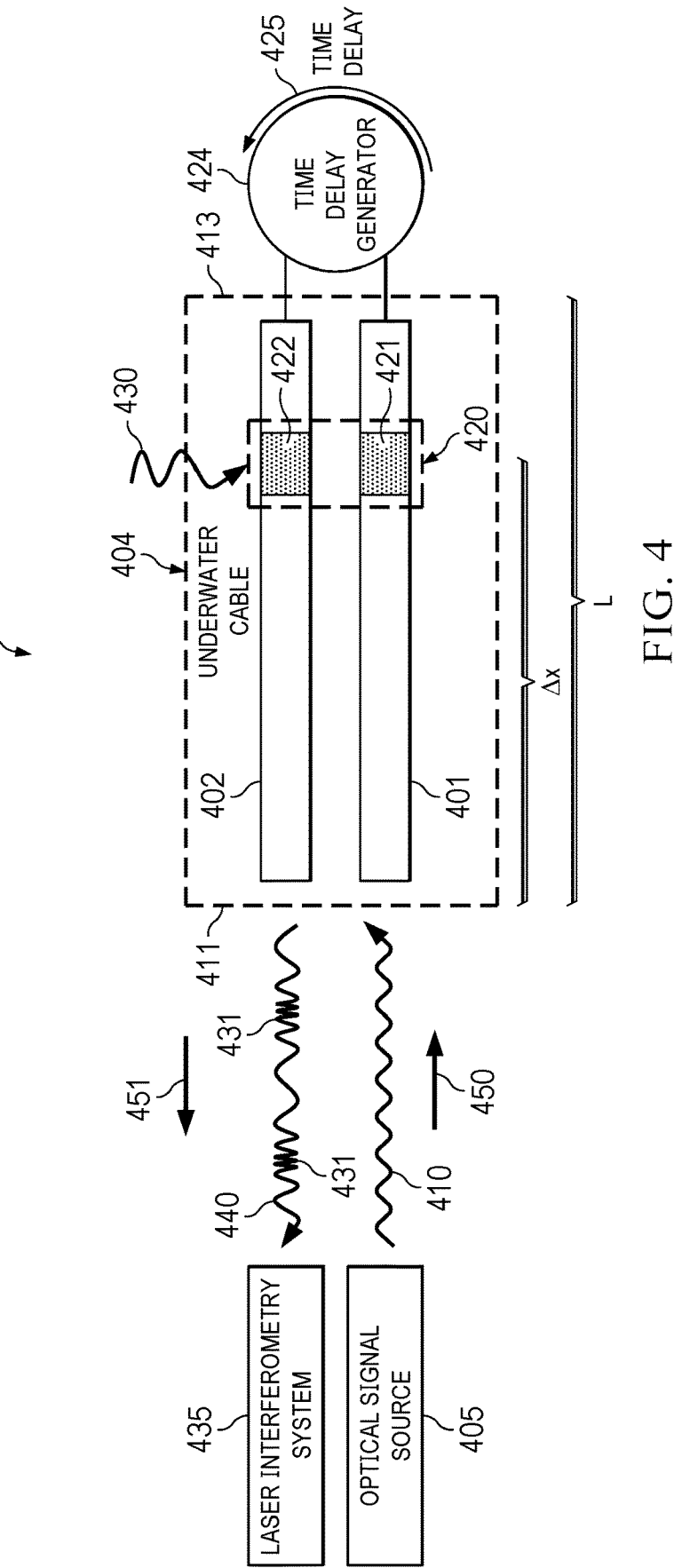
FIG. 4 is an illustration of a schematic diagram of a hydroacoustic detection system in accordance with an illustrative embodiment.

With reference now to FIG. 4, an illustration of a schematic diagram of a hydroacoustic detection system is depicted in accordance with an illustrative embodiment. In this illustrative example, a hydroacoustic waves detection system 400 is an example of an implementation for hydroacoustic wave detection system 202 in FIG. 2.

In this example, first optical fiber 401 and second optical fiber 402 are located in underwater cable 404. In this example, underwater cable 404 has length L. As depicted, optical signal source 405 transmits light signals 410 and are transmitted through first optical fiber 401 in underwater cable 404 at first end 411 in first direction 450. Light signals 410 are pure or unperturbed light signals. In other words, light signals 410 are in the form as transmitted by optical signal source 405 and have not been altered or changed by hydroacoustic waves 430 impinging on underwater cable 404.

In this illustrative example, hydroacoustic waves 430 impinge on underwater cable 404 at location 420. Location 420 is also referred to as a perturbation location, such as perturbation location 207 in FIG. 2.

Hydroacoustic waves 430 cause a localized disturbance at location 420. This localized disturbance can cause at least one of compression or tension in section 421 of first optical fiber 401 and in section 422 of second optical fiber 402 in location 420 underwater cable 404. In these examples, the sections of optical fiber compression and tension can occur in an alternating manner. These changes in the optical fibers change the state of light signals such as light signals 410. These changes can also be referred to as a perturbation of light signals 410. The change in state can be a change in phase in these illustrative examples. In other examples, the changes in the state include a change in polarization or other properties of light signals 410.

In this illustrative example, light signals 410 traveling through first optical fiber 401 are received by time delay generator 424 at second end 413 of underwater cable 404. In this example, time delay generator 424 generates time delay 425 in light signals 410. In this example, time delay generator 424 can switch light signals 410 into a loop within time delay generator 424 for a period of time until these light signals are switched out of time delay generator 424 into second optical fiber 402. Light signals 410 with the time delay traveling in second optical fiber 402 are delayed light signals 440. These delayed light signals travel in second direction 451, which is opposite to first direction 450. Delayed light signals 440 also include perturbations in the form of phase changes 431 caused by hydroacoustic waves 430 in these examples.

In this illustrative example, time delay generator 424 can create increasing time delays in light signals 410. For example, the time delays can be swept by changing the time delays from 0 ms to p ms in increments of i ms.

In this example, delayed light signals 440 are received by laser interferometry system 435. These delayed light signals are interfered with light signals 410 generated by optical signal source 405. The result of the interference can be used to measure phase changes. These phase changes are measured indirectly by the power resulting in the interference of these two light signals with each other. The power measurements are made from measuring the power to form an interferometric response that can be used to detect the presence of hydroacoustic waves 430. Each time a time delay changes, laser interferometry system 435 can make one or more measurements power changes from interfering light signals 410 with delayed light signals 440.

In these illustrative examples, the number of time delays used can be at least 3 time delays. In other examples, more than 3 time delays can be used. In these examples, 3 time delays can provide sufficient information to determine a curve for the power measurements. Each time delay provides a data point in the power measurements.

In these examples, a pattern in the power measured can be used to determine the presence of hydroacoustic waves 430. For example, the magnitudes of power measurements can have a pattern in the magnitudes in which the envelope for magnitude spectrum has a pattern of peaks. Further, these measurements can also have a pattern of normal values. This pattern can be used to determine the presence of hydroacoustic waves 430.

Further, the frequency (f) of hydroacoustic waves 430 can also be determined using this interferometric response. Additionally, location 420 of where hydroacoustic waves 430 impinge on underwater cable 404 can also be determined using the interferometric response. Location 420 can be described as the distance Δx from first end 411 to location 420.

Figure 5:
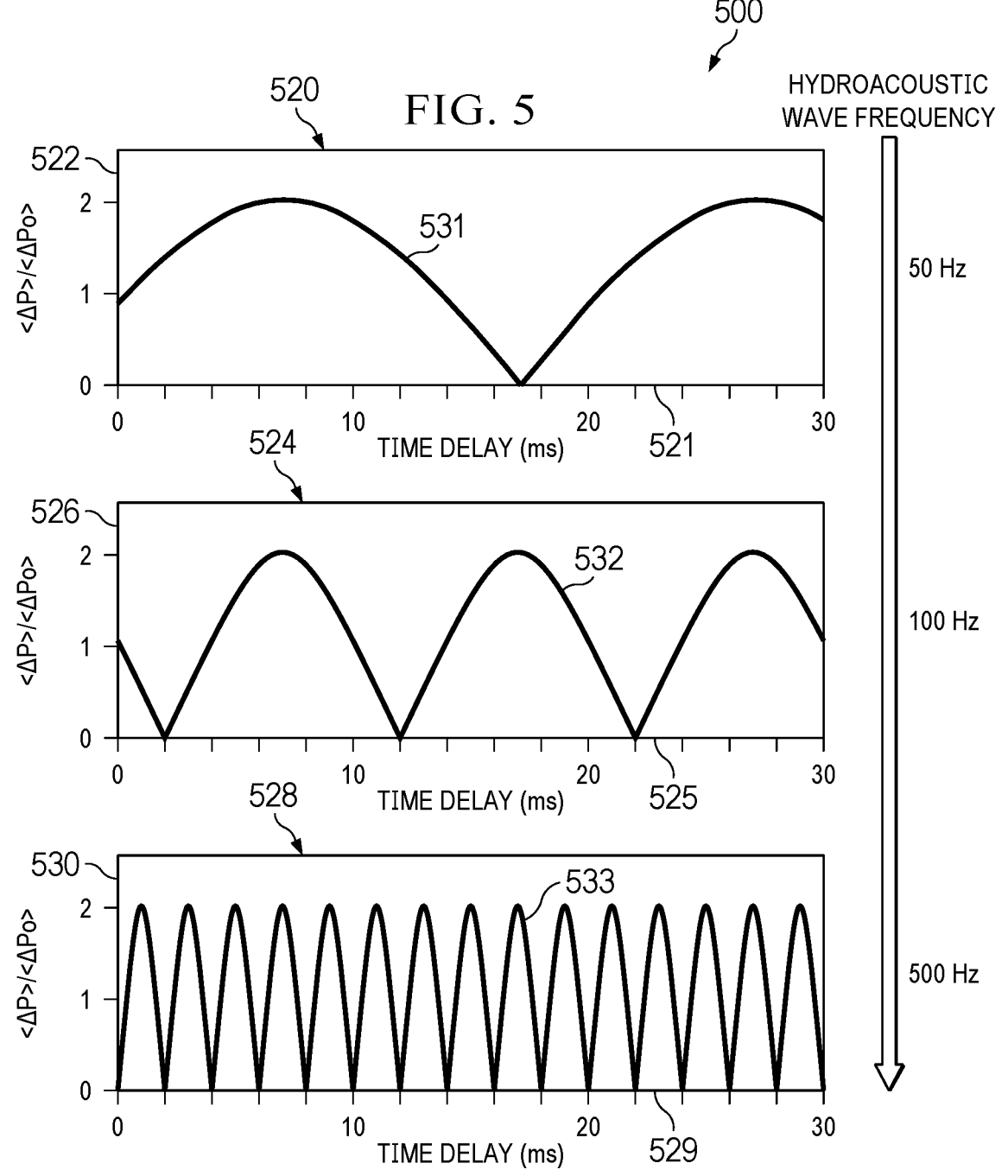
FIG. 5 is an illustration of graphs depicting magnitudes of power measurements versus time delays with different frequencies in accordance with an illustrative embodiment.

With reference now to FIG. 5, an illustration of graphs depicting magnitudes of power measurements versus time delays with different frequencies is depicted in accordance with an illustrative embodiment. In this example, graph 500 depicted curves of the interferometric responses versus time delays. In these examples, an interferometric response comprises measurements of power. These power measurements in the interferometric response can be represented in the form of $<\Delta P>/<\Delta P_o>$, which is the root mean square (rms) power deviation from the interferometer's undisturbed state divided by the rms power deviation from the interferometer's undisturbed state but without the time delay and for a one-way trip. These curves are examples of interferometric responses in the form of magnitudes.

In graph 520, x-axis 521 is time delay and y-axis 522 is $<\Delta P>/<\Delta P_o>$. In graph 524, x-axis 525 is time delay and y-axis 526 is $<\Delta P>/<\Delta P_o>$, and graph 528, x-axis 529 is time delay and y-axis 530 is $<\Delta P>/<\Delta P_o>$.

In these graphs the y-axes are normalized power measurements that form the interferometric response depicted in these graphs. In this depicted example, the power measurements in the interferometric response can be represented as the measurement of power with the time delay divided by the interim for measuring power for one-way trip without the time delay. As a result, these graphs show that the interferometric responses can be as much as twice (i.e. 3 dB) as sensitive as compared to using current techniques.

In this example, curve 531 represents $<\Delta P>/<\Delta P_o>$ obtained for hydroacoustic waves with a frequency of 50 Hz. Curve 532 represents $<\Delta P>/<\Delta P_o>$ for hydroacoustic waves with a frequency of 100 Hz, and curve 533 represents $<\Delta P>/<\Delta P_o>$ obtained for hydroacoustic waves with a frequency of 500 Hz. In these graphs, the period of the peaks changes as the frequency of the hydroacoustic waves changes.

In the illustrative examples, three scenarios are present on what happens to the phase of light signals as the light signals propagate in a first direction from a perturbation location on a first optical fiber in an underwater cable to the same perturbation location but traveling in a second direction on the second optical fiber in the underwater cable. Second direction is opposite of the first direction.

In the first case, if the perturbation frequency is low, and the time it takes the light to travel away in the first direction from perturbation location and then back in the second direction to the perturbation fiber location, the light signals travel through almost the same perturbation. For example, if the light signals travel through a stretched fiber with the fiber being in tension while propagating first direction, the same light signals travel through nearly the same stretched fiber length while propagating back in the second direction.

In this case, the light signals travel through a fiber stretch length that is nearly twice the stretch length of a single fiber. This results in twice the signal strength that is detected for the hydroacoustic waves.

In a second case, the same low frequency perturbation of first case is used. In the second example, a longer time delay is introduced such that by the time the light signals propagate from the perturbation location on the first optical fiber and then back to the same perturbation location on the second optical fiber, the perturbation has significantly changed. For example, if the light signals travel through stretched fiber while propagating in the first direction, the same light signals travel through a compressed fiber while propagating the second direction opposite to the first direction.

In this case, the stretched fiber the light signals travel through going in the first direction is offset by the compressed fiber the light signals traveling the second direction. Consequently, the net change in fiber length is zero, resulting in zero signal strength hydroacoustic waves.

In either case, the same low frequency perturbation of the first case is used. In this case, an even longer time delay as compared to the second case is introduced such that by the time the light signals propagates from the perturbation location on the first optical fiber and then back to same perturbation location on the second optical fiber, the perturbation has changed twice as much as in the second case.

For example, if the light signals travel through a stretched fiber while propagating in the first direction, by the time light signals reach the same perturbation location traveling through the second optical fiber, the perturbation in the section of fiber at the perturbation location might have completed a full cycle from stretch to compression and back to stretch. In this case, the light sees a fiber stretch length that is again twice the stretch length of a single fiber, similar to the first case, again resulting in twice the signal strength. In summary, the first case and the third case results in a 3 dB signal boost in power measurements. The second case has complete signal suppression. As a result, changing the time can provide an ability to detect the presence of hydroacoustic waves.

These 3 cases depict "net perturbation" of the fiber that the light signals travel through. This net perturbation is periodic and continues as the time delay is increased as depicted in graph 500. The hydroacoustic waves can be fully characterized in terms of its frequency and source location. As the hydroacoustic wave frequency increases, the distance between the peaks in the curves decreases as illustrated in graph 500. Although these curves are shown as continuous, the occurrence may not be actually continuous. For example, number of measurements could be taken to curve fit the measurements to estimate peak locations. The number of measurements can be 3 measurements, 7 measurements, 10 measurements, or some other suitable number of measurements. In these examples, 3 measurements is in those number measurements that can provide a desired level of accuracy in identifying a curve.

Figure 6:
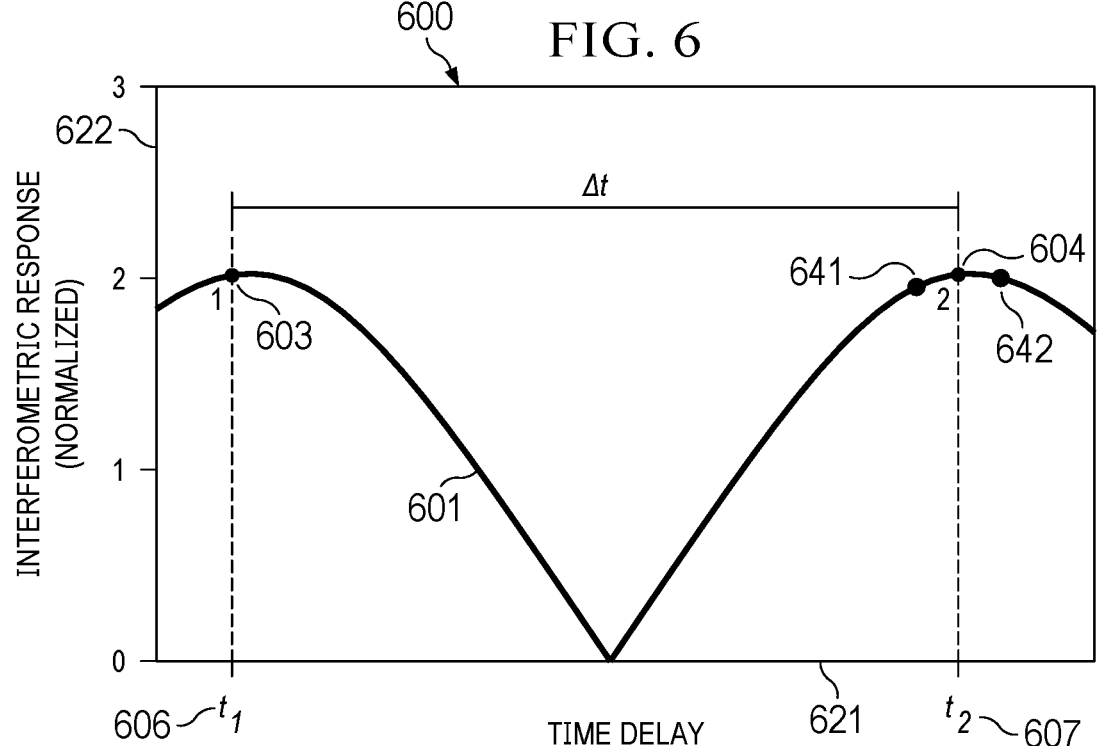
FIG. 6 is an illustration of power measurements versus time delays in accordance with the work environment.

Next in FIG. 6, an illustration of power measurements versus time delays is depicted in accordance with an illustrative embodiment. In this example, the power measurements in graph 600 are magnitudes obtained from normalizing measurements in an interferometric response. X-axis 621 is time delay and y-axis 622 is magnitude of the normalized power measurements. These power measurements are from the interferometric response generated from interfering the light signals and return light signals with time delays. In other words, these power measurements in the interferometric response can be normalized and represented using magnitudes.

As depicted, curve 601 is an interferometric response curve of power measurements for different time delays. As depicted, Δt 602 is the time between peak 1 603 and peak 2 604. These 2 peaks are consecutive peaks in curve 601 and can be identified by peak numbers (N). For example, N=1 is peak 1 603 and N=2 is peak 2 604. In this example, t1 606 is the time delay for peak 1 603, and t2 607 is the time delay for peak 604.

In this illustrative example, the frequency of the perturbation location of hydroacoustic waves solved using equation (1) and equation (2) as follows:

$$f = \frac{1}{\Delta t} \tag{1}$$

$$f = \frac{1}{\pi}\sqrt{\frac{|a|}{2}} \tag{2}$$

where "f" is the frequency, Δt is the time difference between time delays that produce consecutive peaks in the interferometric response curve, "a" is the second derivative of a peak.

In this example, two equations, equation (1) and equation (2) are present to determine frequency. In this example, equation (1) only requires measurements that spans two peaks. For example, measurements that identify the power of peak 1 603 and peak 2 604 are sufficient to determine the frequency using equation (1).

With equation (2) only one peak is needed because this equation uses the curvature of a single peak. This curvature can be identified measurements that are so closely spaced to enable determining curve 601 at the peak. For example, 3 measurements such as point 641, peak 2 604, and point 642 can be sufficient to identify the curve peak 2 604.

The frequency identified from these equations can be used to determine the perturbation location as follows in equation (3) and equation (4):

$$\frac{\Delta x}{L} = 1 - \frac{c/n}{2L}\left(\frac{N}{f} - t_N\right) \tag{3}$$

$$0 \le \frac{\Delta x}{L} \le 1 \tag{4}$$

where Δx is the distance from the transmission source of the underwater cable to the perturbation location, L is the length of the underwater cable, c is the speed of light in a vacuum, n is effective refractive index of the fiber for the light signal used, N is the peak number, and $t_N$ is the time delay for the Nth peak.

In addition to the condition of equation (4), one solution exists for certainty in the value of Δx. Since peak numbers may not be known, equation (3) solutions for many values of N for a given peak should be compared to equation (3) solutions to many values of N for another peak. If the same value of Δx exists in both sets of solutions, is positive, and is less than 1, then it is certain that Δx is the correct location of the hydroacoustic wave. If on the other hand, there is more than one solution for Δx that matches the sets of solutions, the location of hydroacoustic wave could be any one of the matching Δx values.

Figure 7:
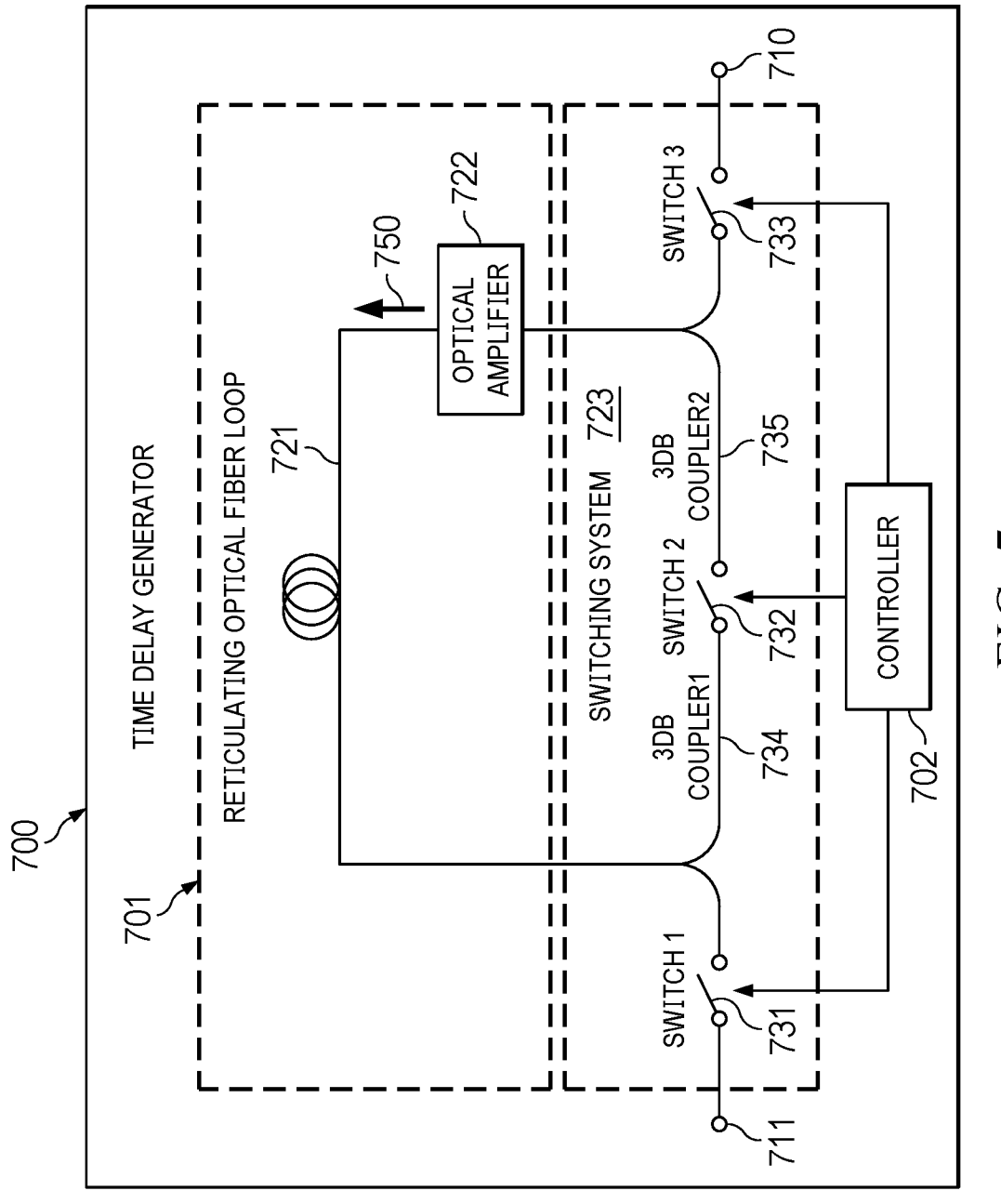
FIG. 7 is an illustration of a schematic diagram of a time delay generator in accordance with an illustrative embodiment.

With reference now to FIG. 7, an illustration of a schematic diagram of a time delay generator is depicted in accordance with an illustrative embodiment. In this illustrative example, time delay generator 700 is an example of an implementation for time delay generator 109 in FIG. 1, time delay generator 220 in FIG. 2, and time delay generator 424 in FIG. 4.

In this illustrative example, time delay generator 700 comprises recirculating optical fiber loop 701 and controller 702. In this example, controller 702 is a hardware component and can include software. Controller 702 can be a component in hydroacoustic wave detector 214 or component within computer system 212 in some illustrative examples.

For example, controller 702 can be selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices.

Controller 702 controls recirculating optical fiber loop 701. For example, controller 702 introduces a time delay by switching light signals into and out of recirculating optical fiber loop 701. In this example, signals can enter recirculating optical fiber loop 701 at input 710 and light signals can exit recirculating fiber loop at output 711. In this example, controller 702 can control recirculating optical fiber loop 701 to recirculate light signals for a period of time to introduce a time delay.

As depicted, recirculating optical fiber loop 701 comprises a number of different components. As depicted, recirculating optical fiber loop 701 comprises optical fiber loop 721, optical amplifier 722, and switching system 723.

Optical fiber loop 721 provides a loop in which light signals can recirculate or travel. Optical amplifier 722 operates to boost the power of light signals traveling through optical fiber loop 721. In this manner, signal loss due to attenuation or other lysing conditions can be reduced.

In this example, switching system 723 comprises switch 1 731, switch 2 732, switch 3 733, 3 dB coupler1 734, and 3 dB coupler2 735. Switch 1 731 is connected to switch 2 732 by 3 dB coupler1 734. Switch 1 731 is also connected to optical fiber loop 721. In this example, switch 2 is connected to switch 3 by 3 dB coupler2 735. Switch 2 735 is also connected to optical amplifier 722 through 3 dB coupler2 735.

In this illustrative example, controller 702 controls the operation of switches and switching system 723. Light signals can enter recirculating optical fiber loop 701 at input 710. As light signals enter recirculating optical fiber loop 701, switch 1 731 is open, switch 2 732 is open, and switch 3 733 is closed. This configuration of the switches causes light signals to flow through optical fiber loop 721 in the direction of arrow 750. After the light signals enter optical fiber loop 721, switch 2 732 closes and switch 3 733 opens. With this configuration of the switches, the light signals circulate within optical fiber loop 721. Controller 702 controls how long the light signals circulate within optical fiber loop 721 to create a time delay with a desired selected value.

In this example, the configuration of the switches change such that switch 1 731 is closed, switch 2 732 is open, and switch 3 733 is closed. With this configuration of switches, the light signals circulating within optical fiber loop 721 now exit through output 711 into the second optical fiber.

In one illustrative example, the time delays generated by controller 702 can be continuously swept. In another example, the time delays can be periodically swept. Time delays created using the switches in switching system 723 can be used to obtain an estimate of the location where hydroacoustic waves impinged on the underwater cable. In another example, a shorter optical fiber loop can then be used to generate time delays to increase the accuracy in determining the location.

Additionally, the optical fiber loop can be actions performed on the optical fiber engendering time delays to further refine the location. For example, these actions can select at least one of stretching optical fiber loop fiber, changing the temperature of the optical fiber loop, or applying pressure to the optical fiber loop. In this example, periodically swept means that the first time delay would be one loop of the circulator, the second time delay would be two loops of the circulator, the third time delay would be three loops, etc. Or the first time delay would be 5 loops of the circulator, the second time delay would be 10 loops of the circulator, the third time delay would be 15 loops, etc.

Figure 8:
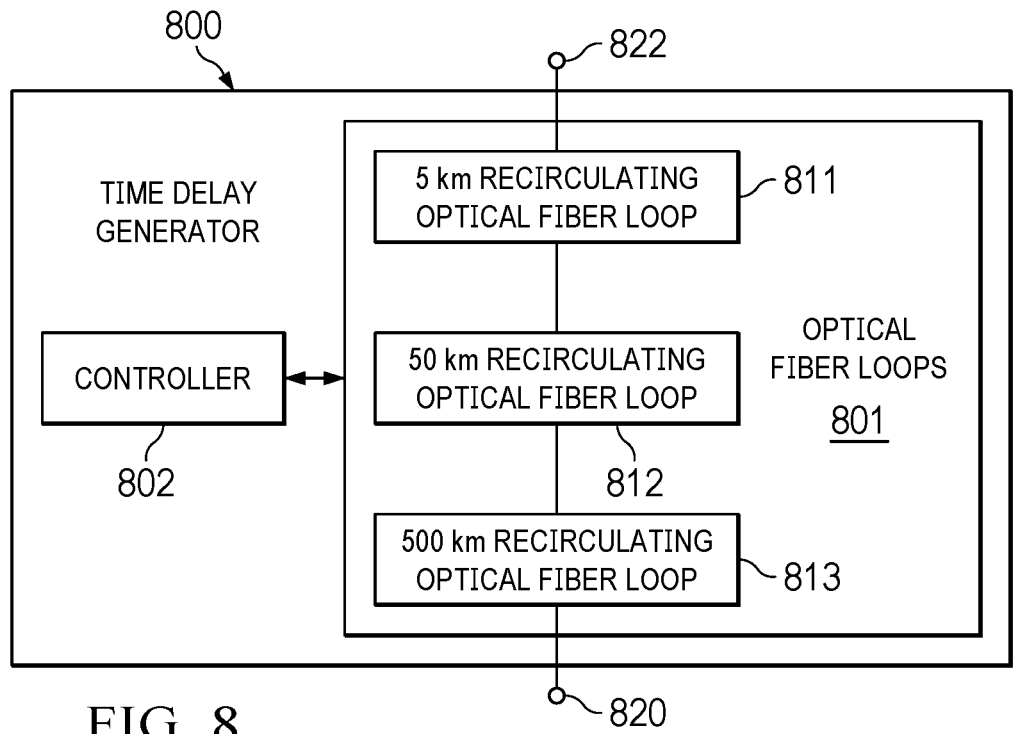
FIG. 8 is an illustration of a schematic diagram of a time delay generator in points with an illustrative embodiment.

With reference next to FIG. 8, an illustration of a schematic diagram of a time delay generator is depicted in points with an illustrative embodiment. Time delay generator 800 is an example of an implementation for time delay generator 109 in FIG. 1, time delay generator 220 in FIG. 2, and time delay generator 424 in FIG. 4.

In this example, time delay generator 800 comprises recirculating optical fiber loops 801 and controller 802. In this example, recirculating optical fiber loops 801 can be implemented using recirculating optical fiber loop 701 in FIG. 7. As depicted, light signals enter optical fiber loops 801 at input 820 and exit as delayed light signals at output 822.

In this example, optical fiber loops 801 comprise 5 km recirculating optical fiber loop 811, 50 km recirculating optical fiber loop 812, and 500 km recirculating optical fiber loop 813. In this example, 5 km recirculating optical fiber loop 811 has an optical fiber loop that is 5 km long; 50 km recirculating optical fiber loop 812 has an optical fiber loop that is 50 km long; and 500 km recirculating optical fiber loop 813 has an optical fiber loop that is 500 km long.

These optical fiber loops are connected to each other in series. By using optical fiber loops with different lengths, the perturbation location where that hydroacoustic waves impinged on the underwater cable can be more quickly identified using this configuration.

Illustration of optical fiber loops 801 is only provided as an example and not meant to limit how other examples are implemented. For example, other numbers of optical fiber loops can be used other than 3. In another example, 2 optical fiber loops or 5 optical fiber loops can be present. Further, these optical fiber loops can have other lengths such as 3 km, 30 km, or some other length.

Figure 9:
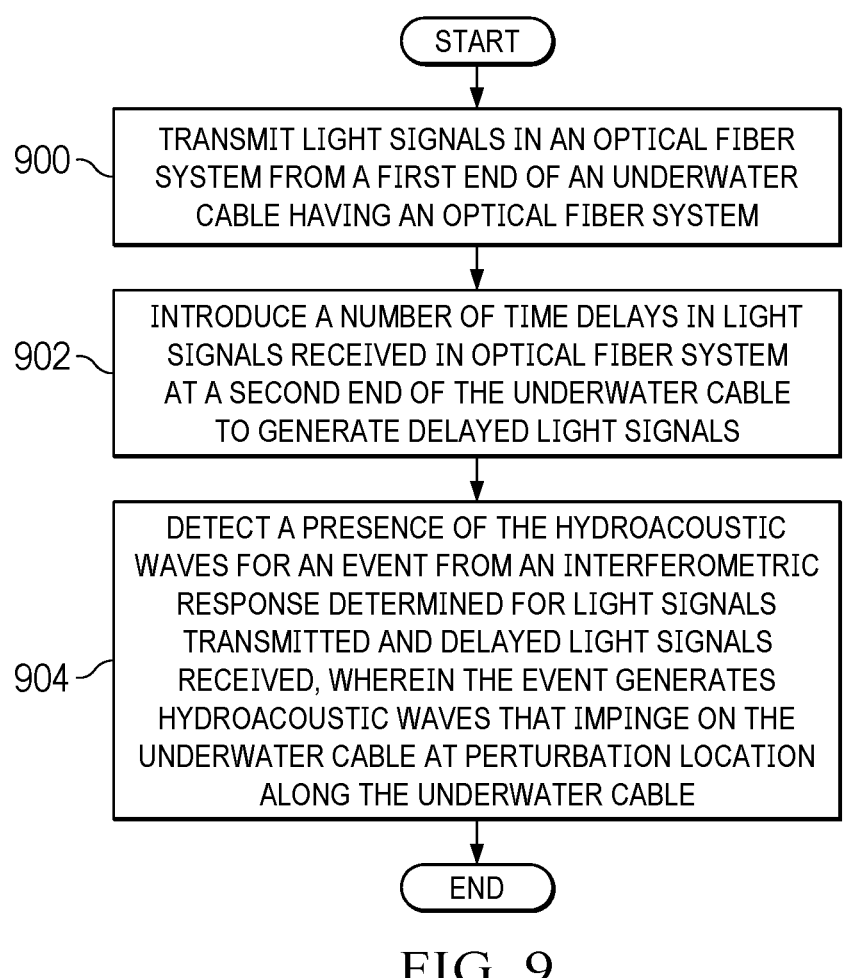
FIG. 9 is an illustration a flowchart of a process for detecting hydroacoustic waves in accordance with an illustrative embodiment.

With reference now to FIG. 9, an illustration of a flowchart of a process for detecting hydroacoustic waves is depicted in accordance with an illustrative embodiment. The process in FIG. 9 can be implemented in hardware, software, or both. When implemented in software, the process can take the form of program instructions that are run by one of more processor units located in one or more hardware devices in one or more computer systems. For example, the process can be implemented in hydroacoustic waves detector 214 in hydroacoustic wave detection system 202 in FIG. 2.

In FIG. 9, the process transmits light signals in an optical fiber system from a first end of an underwater cable having an optical fiber system (operation 900). The process introduces a number of time delays in light signals received in optical fiber systems at a second end of the underwater cable to generate delayed light signals (operation 902).

The process detects a presence of the hydroacoustic waves for an event from an interferometric response determined for light signals transmitted and delayed light signals received, wherein the event generates hydroacoustic waves that impinge on the underwater cable at perturbation location along the underwater cable (operation 904). The process terminates thereafter.

Figure 10:
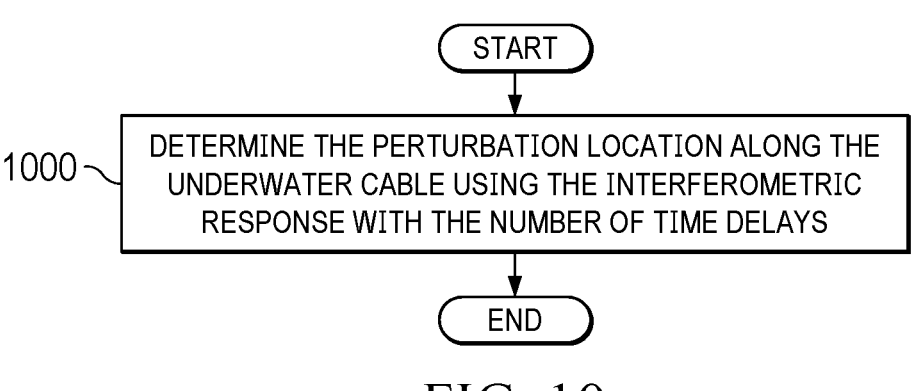
FIG. 10 is an illustration of a flowchart of a process for determining a location of the hydroacoustic wave in accordance with an illustrative embodiment.

Turning now to FIG. 10, an illustration of a flowchart of a process for determining a location of the hydroacoustic wave is depicted in accordance with an illustrative embodiment. The process in this figure is an example of an additional operation that can be performed with the operations in FIG. 8.

The process determines the perturbation location along the underwater cable using the interferometric response with the number of time delays (operation 1000). The process terminates thereafter.

Figure 11:
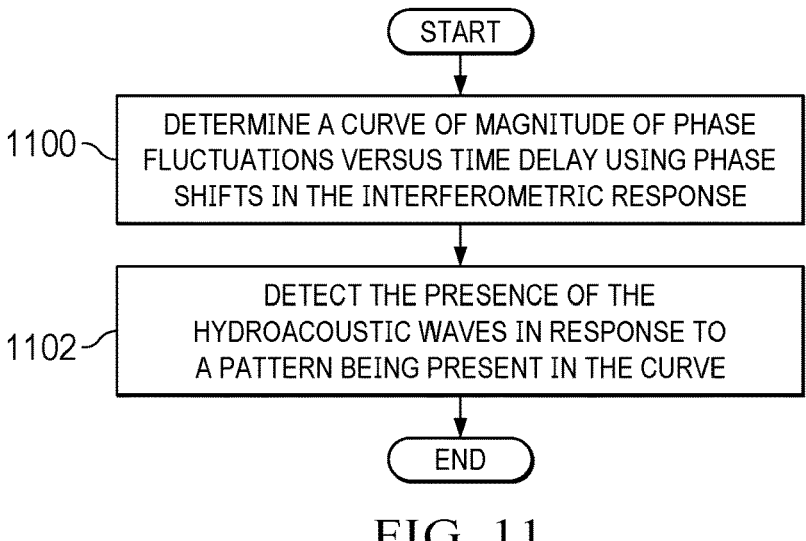
FIG. 11 is an illustration of a flowchart of a process for detecting a presence of hydroacoustic waves in accordance with an illustrative embodiment.

In FIG. 11, an illustration of a flowchart of a process for detecting a presence of hydroacoustic waves is depicted in accordance with an illustrative embodiment. The process in FIG. 11 is an example of an implementation for operation 804 in FIG. 8.

The process determines a curve of magnitude of phase fluctuations versus time delay using phase shifts in the interferometric response (operation 1100). The process detects the presence of the hydroacoustic waves in response to a pattern being present in the curve (operation 1102). The process terminates thereafter.

Figure 12:
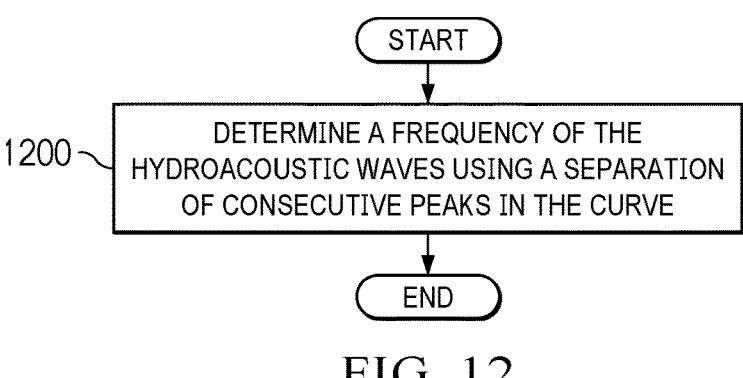
FIG. 12 is an illustration of a flowchart of a process for determining a frequency of hydroacoustic waves in accordance with an illustrative embodiment.

With reference next to FIG. 12, an illustration of a flowchart of process for determining a frequency of hydroacoustic waves is depicted in accordance with an illustrative embodiment. The process in this figure is an example of an additional operation that can form with the operation in FIG. 11.

The process determines a frequency of the hydroacoustic waves using a separation of consecutive peaks in the curve (operation 1200). The process terminates thereafter.

Figure 13:
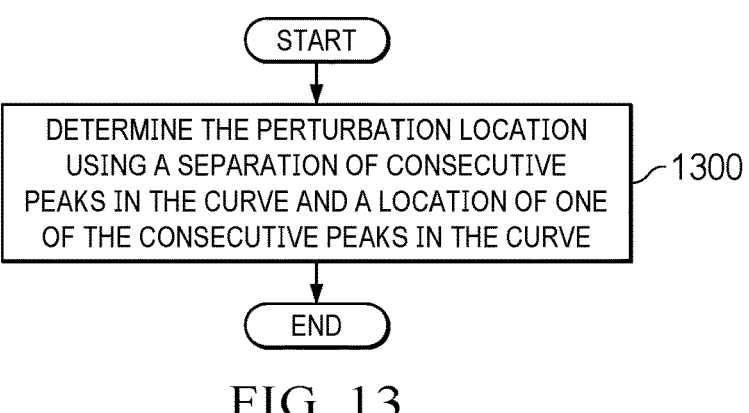
FIG. 13 is an illustration of a flowchart of a process for determining a perturbation location in accordance with an illustrative embodiment.

Turning now to FIG. 13, an illustration of a flowchart of a process for determining a perturbation location is depicted in accordance with an illustrative embodiment. The process in this figure is an example of an additional operation that can form with the operation in FIG. 11.

The process determines the perturbation location using a separation of consecutive peaks in the curve and a location of one of the consecutive peaks in the curve (operation 1300). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, illustrative examples provide a method, apparatus, and system for detecting hydroacoustic waves. In one illustrative example, a hydroacoustic wave detection system that is comprised of a time delay generator and a hydroacoustic wave detector. The time delay generator is connected to an end of an underwater cable in which light signals travel in an optical fiber system in the underwater cable. The time delay generator is configured to introduce a time delay in the light signals received by the time delay generator to generate delayed light signals. The hydroacoustic wave detector is configured to control the time delay generator to generate a number of time delays. The hydroacoustic wave detector is configured to detect a presence of hydroacoustic waves for an event from an interferometric response determined using the light signals transmitted and the delayed light signals received. The hydroacoustic waves impinge on the underwater cable at a perturbation location along the underwater cable.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A hydroacoustic wave detection system comprising:
a time delay generator connected to an end of an underwater cable in which light signals travel in optical fiber system in the underwater cable, wherein the time delay generator is configured to:
introduce a time delay in the light signals received by the time delay generator to generate delayed light signals; and a hydroacoustic wave detector that is configured to:
control the time delay generator to generate a number of time delays; and
detect a presence of hydroacoustic waves for an event from an interferometric response determined using the light signals transmitted and the delayed light signals received, wherein the hydroacoustic waves impinge on the underwater cable at a perturbation location along the underwater cable.

2. The hydroacoustic wave detection system of claim 1, wherein the hydroacoustic wave detector is further configured to:
determine the perturbation location along the underwater cable using the interferometric response with the number of time delays.

3. The hydroacoustic wave detection system of claim 1, wherein in detecting the presence of the hydroacoustic waves, the hydroacoustic wave detector is configured to:
determine a curve of magnitude of phase fluctuations versus time delay using phase shifts in the interferometric response.

4. The hydroacoustic wave detection system of claim 3, wherein in detecting the presence of the hydroacoustic waves, the hydroacoustic wave detector is configured to:
detect the presence of the hydroacoustic waves in response to a pattern being present in the curve.

5. The hydroacoustic wave detection system of claim 4, wherein in detecting the presence of the hydroacoustic waves, the hydroacoustic wave detector is configured to:
determine a frequency of the hydroacoustic waves using a separation of consecutive peaks in the curve.

6. The hydroacoustic wave detection system of claim 4, wherein in determining the perturbation location, the hydroacoustic wave detector is configured to:
determine the perturbation location using a separation of consecutive peaks in the curve and a location of one of the consecutive peaks in the curve.

7. The hydroacoustic wave detection system of claim 1, wherein the time delays are selected to boost the interferometric response and filter the interferometric response to suppress a number of unwanted frequencies in the interferometric response simultaneously.

8. The hydroacoustic wave detection system of claim 1, wherein the time delay generator comprises:
recirculating optical fiber loop; and
a controller configured to:
introduce a time delay by switching the light signals into and out of recirculating optical fiber loop.

9. The hydroacoustic wave detection system of claim 8, recirculating optical fiber loop comprises:
an optical fiber loop;
an optical amplifier connected to optical fiber loop; and
a switching system;
wherein introducing the time delay, the controller is configured to control the switching system to switch the light signals into and out of the optical fiber loop that introduces the time delay and wherein the optical amplifier amplifies the light signals traveling with the optical fiber loop.

10. The hydroacoustic wave detection system of claim 1, wherein the hydroacoustic waves are generated by an event selected from a group comprising an earthquake, volcanic activity, an underwater landslide, an iceberg collision, a meteor impact, and a whale call.

11. A hydroacoustic wave detection system comprising:
a time delay generator connected to an end of an underwater cable in which light signals travel in an optical fiber system in the underwater cable, wherein the time delay generator system is configured to:

receive the light signals in a first optical fiber in the optical fiber system from a source location;

introduce a time delay in the light signals to form delayed light signals; and transmit the delayed light signals with the time delay in a second optical fiber in the optical fiber system to the source location;

a laser interferometry system connected to the optical fiber system in the underwater cable at the source location, wherein the laser interferometry system is configured to:

determine an interferometric response for the light signals transmitted in the first optical fiber and the delayed light signals received in the second optical fiber; and an hydroacoustic wave detector that is configured to:

control the time delay generator to generate a number of time delays;

detect a presence of hydroacoustic waves for an event from an interferometric response determined using the light signals transmitted and the delayed light signals received, wherein the hydroacoustic waves impinge on the underwater cable at a perturbation location along the underwater cable; and determine the presence of the perturbation location along the underwater cable using the interferometric response with the number of time delays.

12. The hydroacoustic wave detection system of claim 11, wherein in detecting the presence of the hydroacoustic waves, the hydroacoustic wave detector is configured to:

determine a curve of magnitude of phase fluctuations versus time delay using phase shifts in the interferometric response.

13. The hydroacoustic wave detection system of claim 12, wherein in detecting the presence of the hydroacoustic waves, the hydroacoustic wave detector is configured to:

detect the presence of the hydroacoustic waves in response to a pattern being present in the curve.

14. The hydroacoustic wave detection system of claim 13, wherein in detecting the presence of the hydroacoustic waves, the hydroacoustic wave detector is configured to:

determine a frequency of the hydroacoustic waves using a separation of consecutive peaks in the curve.

15. The hydroacoustic wave detection system of claim 11, wherein in determining the perturbation location, the hydroacoustic wave detector is configured to: determine the perturbation location using a location of consecutive peaks in a curve.

16. A method for detecting hydroacoustic waves, the method comprising:

transmitting light signals in an optical fiber system from a first end of an underwater cable having an optical fiber system;

introducing a number of time delays in light signals received in optical fiber system at a second end of the underwater cable to generate delayed light signals; and detecting a presence of the hydroacoustic waves for an event from an interferometric response determined for light signals transmitted and delayed light signals received, wherein the event generates hydroacoustic waves that impinge on the underwater cable at perturbation location along the underwater cable.

17. The method of claim 16 further comprising:

determining the perturbation location along the underwater cable using the interferometric response with the number of time delays.

18. The method of claim 16, wherein detecting the presence of the hydroacoustic waves comprise:

determining a curve of magnitude of phase fluctuations versus time delay using phase shifts in the interferometric response.

19. The method of claim 18, wherein detecting the presence of the hydroacoustic waves comprises:

detecting the presence of the hydroacoustic waves in response to a pattern being present in the curve.

20. The method of claim 19 further comprising:

determining a frequency of the hydroacoustic waves using a separation of consecutive peaks in the curve.

21. The method of claim 18, wherein determining the perturbation location comprises:

determining the perturbation location using a separation of consecutive peaks in the curve and a location of one of the consecutive peaks in the curve.

\* \* \* \* \*